Patented Mar. 13, 1951

2,544,808

UNITED STATES PATENT OFFICE 2,544,808

DIMERIZATION OF BUTADIENE

Eldon E. Stahly, Pittsburgh, Pa., assignor to Koppers Company, Inc., Pittsburgh, Pa., a corporation of Delaware No Drawing. Application September 25, 1947, Serial No. 776,157

2 Claims. (Cl. 260—666)

The present invention relates to the preparation of the dimer of butadiene-1,3, which polymer is 4-vinylcyclohexene-1. The invention relates particularly to an improved catalytic process for the preparation of 4-vinylcyclohexene by polymerization of butadiene-1,3 while avoiding to a great extent the loss of butadiene arising from its conversion to other compounds, particularly higher, solid polymers.

Ordinarily in the thermal polymerization of butadiene a high-molecular weight solid polymer is formed in sizable quantities and this, of course, interferes with the formation of the dimer. The so-called dimer is useful as an intermediate in preparing aromatic compounds from aliphatic hydrocarbons, as it can be readily dehydrogenated to an aromatic derivative.

It is a primary object of the present invention to provide a process whereby improved yields of 4-vinylcyclohexene-1 can be obtained from butadiene-1,3.

It is a further object of the invention to provide a process by which improved yields of 4-vinylcyclohexene-1 can be obtained from butadiene without material loss of butadiene from the synthesis by its polymerization to solid high polymers.

The invention has for further objects such other operative advantages or results as may be found to obtain in the processes or apparatus hereinafter described or claimed.

According to the present invention butadiene is dimerized at temperatures between 110° and 150° C. under high pressures, preferably of about 40 atmospheres, using a copper or chromium salt that is soluble in the butadiene in catalytic quantities to catalyze the formation of dimer.

Extremely high pressures, that is, of the order of one thousand atmospheres and above are effectively employable in the process and reduce the reaction time from hours to a few minutes. Higher temperatures preferably those up to but not higher than the critical temperature of butadiene (163° C.) also provide accelerated reaction rates.

Inasmuch as the process is carried out below the critical temperature (160° C.) and above the critical pressure (625 lbs. per sq. in.), applicant's process is a liquid phase reaction. The presence of the catalyst in solution in the liquid markedly increased the rate of dimerization and appears to act primarily as a catalyst for dimerization rather than an inhibitor of solid polymerization. The slowness of the dimerization, as previously observed in the literature, has been a deterrent to the utilization of this method of synthesis and the improved process of applicant substantially overcomes this disadvantage. For example, Lebedev (C. A. 6 855 (1912)) required ten days at 150° C. to obtain a solid and liquid polymer and Savelev et al. (C. A. 30, page 7385 (1936)) required 29 days to produce 26% dimer at 80° C. even though he employed 3.2% of copper naphthenate and no polymer was formed. Savelev recognized copper naphthenate and oleate to be inhibitors of polymerization. In development of the present process it was found that the oleate is not a satisfactory catalyst of dimerization or polymerization.

There is such a large amount of the butadiene monomer consumed in the dimerization over a period of time in a single reaction that the rate of reaction over the period of a complete testing is not exactly uniform. Substantially less than 20% unreacted butadiene was obtained in the reaction mass after every instance of employing the process of invention, whereas over 20% would be expected on the basis of previously reported reaction rate constants.

The selected catalyst, for the purpose of providing large yields of vinylcyclohexene, can be either copper or chromium salts of compounds which are soluble in butadiene, for example, naphthenates or resinates. When copper naphthenate is employed as a catalyst, useful concentrations of catalysts range from 0.2% to 0.4% by weight of copper. At the higher concentration only dimer is produced and traces of solid polymer can be detected.

Thermal polymerization of butadiene without a catalyst was carried out at temperatures from 115 to 150° C. for a period of 48 hours in sealed glass tubes. The polymerization resulted in the formation of both vinylcyclohexene and solid polymer. Addition of traces of copper or chromium salts soluble in butadiene catalyzed a liquid phase dimerization; the addition of similar manganese salt increased the yield of solid polymer at the expense of dimer formation. The dimer was found to be 4-vinylcyclohexene-1 and it was found that the 4-vinylcyclohexene-1 does not polymerize under the conditions of applicant's process to produce solid polymer.

4-vinylcyclohexene-1 was prepared according to the process of invention by charging 14 parts by weight of butadiene to precooled individual glass tubes. After the tubes were charged 1/10 of a part by weight of the catalyst was added thereto. The tubes were sealed off at a temperature of about −80° C., warmed to room temperature and thereafter heated in an oven to a temperature of 150° C. They were placed in the oven at 115°, were heated for a period of 48 hours to 150° C., were then removed and cooled to −80° C. The liquid contents of the tubes were separated from the solid polymer by simple decantation. The separated liquid was then distilled to recover the butadiene dimer. The following table shows the results of several dimerization tests in which improved yields of dimer were obtained.

*Table I*

| Tube No. | Salt Added | Approx. Per Cent Metal on $C_4H_6$ | Approximate Per Cent | | |
|---|---|---|---|---|---|
| | | | $C_4H_6$ | Dimer | Solid Polymer |
| 1 | None | | 8 | 57 | 35 |
| 2 | copper naphthenate | 0.1 | 2 | 63 | 35 |
| 3 | copper resinate | 0.2 | 5 | 77 | 18 |
| 4 | chromium naphthenate | 0.1 | 5 | 65 | 30 |
| 5 | copper naphthenate | 0.2 | 2 | 86 | 12 |

It can be seen from an inspection of the above table that the percentage of metal employed with respect to the butadiene is of importance in governing the yield of dimer to be obtained. For example, 0.2% of copper naphthenate provided the highest yield, 86% of the dimer. In the same manner it may be desired to employ even higher concentrations of a copper or chromium salt so as to lead to substantially only dimerization of butadiene.

A comparison of the yields obtained when no catalytic salt was added with the yields obtained from runs employing the catalyst show that the added salts are catalysts of the dimerization rather than being inhibitors of the polymerization. It is noted that in the above tests when using catalyst, the concentration of dimer is substantially increased and residual butadiene is lowered in comparison with the non-catalytic test. No inhibition of the solid polymerization reaction was observed; the action of the added copper salt is clearly catalysis of the dimerization reaction, since 10% to 29% increase in yield of dimer having been obtained thus reducing the polymerization to form solid polymer. Chromium naphthenate, as noted, has a similar effect.

The 4-vinylcyclohexene-1 produced by the process of invention was identified by spectrographic methods and by determination of refractive index and similar identifying means as, for example, preparation of the bromide, and was substantially pure containing only a very small amount of heavier material, supposedly a trimer of butadiene.

The following table discloses the data obtained in the identification of the vinylcyclohexene:

*Table II*

| | Observed | Literature Data |
|---|---|---|
| Refractive index ($N_D^{20}$) | 1.4630 to 1.4650 | 1.4638 and 1.4653. |
| Boiling Point, ° C. | 125–30 (740 mm.) | 129.5–30.5 (760 mm.); 126–7. |
| Density ($D_4^{20}$) | 0.83 | 0.8320. |
| Bromine No | 280 | 295. |
| Tetrabromide, M. P. (° C.) | 81–84 | 74.5° (cis); 101.5° (Trans.). |
| Mixed melting point with authentic sample having M. P. 74–79° C. | 74–84 | |
| Per cent Bromine in tetrabromide. | 74.8 | 74.7 (calc.). |

The invention as hereinabove set forth is embodied in particular form and manner but may be variously embodied within the scope of the claims hereinafter made.

I claim:

1. A process of dimerizing butadiene-1,3 to produce 4-vinylcyclohexene-1 comprising: heating the butadiene in liquid phase at a pressure of 40 to 1000 atmospheres at a temperature of 150° to 160° C. for a period of a few minutes in the presence of a metal naphthenate salt catalyst selected from the group consisting of copper naphthenate and chromium naphthenate to obtain a dimer yield in excess of 60% by weight of butadiene treated.

2. A process of dimerizing butadiene-1,3 to produce 4-vinylcyclohexene-1 comprising: heating the butadiene in liquid phase at a pressure of 40 to 1000 atmospheres to a temperature of 150° to 160° C. for a period of a few minutes in the presence of 0.2 to 0.4% by weight of the butadiene treated of a naphthenate salt catalyst selected from the group consisting of copper naphthenate and chromium naphthenate to produce in excess of 70% by weight of dimer based on the weight of butadiene treated, decanting the reaction mixture to separate a liquid dimer therefrom and distilling the dimer to recover refined 4-vinylcyclohexene-1.

ELDON E. STAHLY.

REFERENCES CITED

The following references are of record in the file of this patent:

UNITED STATES PATENTS

| Number | Name | Date |
|---|---|---|
| 2,438,041 | Dutcher | Mar. 16, 1948 |

FOREIGN PATENTS

| Number | Country | Date |
|---|---|---|
| 343,116 | Great Britain | Feb. 16, 1931 |
| 847,878 | France | July 10, 1939 |